United States Patent [19]
Drake et al.

[11] Patent Number: 6,090,272
[45] Date of Patent: Jul. 18, 2000

[54] PROCESS FOR CONVERTING A CRACKED GASOLINE USING A ZEOLITE-BASED CATALYST MATERIAL

[75] Inventors: Charles A. Drake, Nowata; An-hsiang Wu, Bartlesville, both of Okla.

[73] Assignee: Phillips Petroleum Company, Bartlesville, Okla.

[21] Appl. No.: 09/220,958

[22] Filed: Dec. 28, 1998

[51] Int. Cl.$^7$ .................................................. C10G 35/085
[52] U.S. Cl. .................... 208/138; 208/118; 208/120.01; 208/120.25; 208/134; 208/135; 208/137; 585/648; 585/650; 585/651; 585/407; 585/418; 585/435; 585/439
[58] Field of Search ............................... 208/118, 120.01, 208/120.25, 134, 135, 137, 138; 585/648, 650, 651, 407, 418, 435, 439

[56] References Cited

U.S. PATENT DOCUMENTS

| | | | |
|---|---|---|---|
| 3,756,942 | 9/1973 | Cattanach | 208/137 |
| 3,770,614 | 11/1973 | Graven | 208/62 |
| 3,960,978 | 6/1976 | Givens et al. | 260/673 |
| 4,097,367 | 6/1978 | Haag et al. | 208/135 |
| 4,429,176 | 1/1984 | Chester et al. | 585/481 |
| 4,720,602 | 1/1988 | Chu | 585/407 |
| 4,975,402 | 12/1990 | Le Van Mao et al. | 502/69 |
| 5,981,418 | 11/1999 | Drake et al. | 502/64 |
| 5,997,730 | 12/1999 | Drake et al. | 208/135 |

*Primary Examiner*—Walter D. Griffin
*Assistant Examiner*—Nadine Preisch
*Attorney, Agent, or Firm*—Richmond, Hitchcock, Fish & Dollar

[57] ABSTRACT

A process for producing catalyst compositions for converting a cracked gasoline feedstock to a product comprising incremental aromatics and lower olefins. The catalyst compositions produced thereby. A process for converting a cracked gasoline feedstock to a product comprising incremental aromatics and lower olefins.

23 Claims, No Drawings

PROCESS FOR CONVERTING A CRACKED GASOLINE USING A ZEOLITE-BASED CATALYST MATERIAL

BACKGROUND OF THE INVENTION

The invention relates to a process for increasing the conversion of a cracked gasoline feedstock to ethylene and propylene with a low rate of coke formation during the conversion of such hydrocarbons in the presence of an improved zeolite-based catalyst material.

It is known to catalytically crack non-aromatic gasoline boiling range hydrocarbons, particularly hydrocarbons such as paraffins and olefins, to lower olefins (such as ethylene and propylene) and aromatic hydrocarbons (such as benzene, toluene and xylenes) in the presence of catalysts which contain a zeolite (such as ZSM-5), as is described in an article by N. Y. Chen et al. in Industrial & Engineering Chemistry Process Design and Development, Volume 25, 1986, pages 151–155. The reaction products of the catalytic cracking processes contain a multitude of hydrocarbons such as unconverted $C_5+$ alkanes, lower alkanes (methane, ethane, propane). lower alkenes (ethylene and propylene), $C_6-C_8$ aromatic hydrocarbons (benzene, toluene, xylenes and ethylbenzene) and $C_9+$ aromatic hydrocarbons. It can be desirable to further process the product from a catalytic gasoline cracking operation to increase the yield of compounds that, in a current market, are relatively more valuable than other products of gasoline cracking. The cracking operation yield of lower olefins (such as ethylene and propylene) and BTX (benzene, toluene, xylene and ethylbenzene) aromatics, for example, can be increased using the improved zeolite catalyst compositions of this invention.

In the conversion of hydrocarbons to aromatic hydrocarbons and lower olefins using zeolite catalysts an excessive amount of coke can be formed. The formation of coke during the zeolite catalyzed aromatization of hydrocarbons tends to cause catalyst deactivation. In processes for the aromatization of hydrocarbons and the formation of lower olefins from hydrocarbons it is, therefore, desirable to minimize the formation of coke.

SUMMARY OF THE INVENTION

It is an object of this invention to at least partially convert hydrocarbons to ethylene, propylene and BTX aromatics.

It is another object of this invention to provide a hydrocarbon conversion process that minimizes the rate of coke formation during the conversion of the hydrocarbons.

Another object of this invention is to provide an improved zeolite-based catalyst that on being utilized in the conversion of hydrocarbons gives an improved yield of lower olefins and BTX aromatics.

Still another object of this invention is to provide an improved zeolite-based catalyst that on being utilized in the conversion of hydrocarbons minimizes the rate of coke formation during the conversion of the hydrocarbons.

A further object of this invention is to provide a method for making an improved zeolite-based catalyst that on being utilized in the conversion of hydrocarbons yields a product having an improved yield of lower olefins and BTX aromatics.

A still further object of this invention is to provide a method for making an improved zeolite-based catalyst that utilized in the conversion of hydrocarbons minimizes the rate of coke formation during the conversion of the hydrocarbons.

The inventive compositions are those made by specific variations of a basic preparation scheme in which a zinc compound has been added to a zeolite with the resulting zinc-containing zeolite composition subjected to the addition of a silylating agent. In one embodiment of the invention the zinc-containing zeolite is subjected to a steam treatment before the silylating agent is added thereby producing a catalyst product that is described as a silylated, steam treated, zinc-impregnated zeolite. In another embodiment zeolite is subjected to acid leaching before the zinc is incorporated into the zeolite thereby producing a catalyst product that is described as a silylated, zinc-incorporated, acid leached zeolite. Non-aromatic hydrocarbons can be converted to aromatics and lower olefins with low coke production by subjecting a hydrocarbon feedstock containing non-aromatics to conversion conditions in the presence of the inventive compositions.

Other objects and advantages of the invention will become apparent from the detailed description and the appended claims.

DETAILED DESCRIPTION OF THE INVENTION

The Zeolite

The zeolite material used in making the inventive compositions of this invention can be any zeolite which when contacted with non-aromatic hydrocarbons under suitable operating conditions is effective in the conversion of non-aromatic hydrocarbons to aromatic hydrocarbons. Preferably, the zeolite has a constraint index (as defined in U.S. Pat. No. 4,097,367, which is incorporated here by reference) in the range of about 0.4 to about 12, more preferably about 2 to about 9. Generally the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38 and mixtures thereof. Some of these zeolites are also known as "MFI" or "Pentasil" zeolites. The presently most preferred zeolite is ZSM-5.

The zeolite can be used directly, as received from the manufacturer, or it can be subjected to a heat treatment, following the conditions set out below, before being used in the preparation of a catalyst by the first embodiment of this invention. In the heat treatment, if employed, the zeolite is exposed, by any suitable method known in the art, to a gas atmosphere under temperature and pressure conditions and for a period of time that is suitable to provide a desired heat treated product.

The gas used in the heat treatment of the acid treated zeolite can be selected from the group consisting of inert gases (nitrogen, helium, argon and the like), reducing gases (carbon monoxide, hydrogen and the like), air, oxygen and steam. The preferred gas is selected from among air, oxygen, nitrogen, steam and mixtures thereof. Most preferably, the treatment gas is selected from among air, oxygen, nitrogen and mixtures of two thereof. Generally, this heat treatment can be conducted at a pressure in a range from below atmospheric pressure to about 1000 pounds per square inch absolute (psia). More typically, however, the pressure range is from about atmospheric to about 100 psia. The temperature of this heat treatment is generally in the range of about 250° C. to about 800° C. Preferably, this temperature range is from about 350° C. to about 700° C. and, most preferably, the temperature of this heat treatment is in a range of about 450° C. to about 600° C.

The time period for conducting this heat treatment must be sufficient to provide a material that is substantially dry, i.e., free of water. Generally, the period of time during which the acid treated zeolite is exposed to treating gas at appropriate conditions of temperature and pressure can range from about 0.1 hour to about 30 hours. Preferably, this heat treatment is conducted for a time period in the range of about 0.25 hour to about 20 hours and, most preferably, from about 0.5 hour to about 10 hours.

A critical aspect of the aromatization process of this invention, as used in a second embodiment of this invention, is the use of a catalyst containing a zeolite material that has been treated with an acid. As used in this specification and in the claims, the term "acid treated zeolite", or "acid leached zeolite", is defined as a zeolite starting material that has been treated with an acid.

According to a second embodiment of this invention any suitable means or method can be used to treat the zeolite starting material with acid. It is preferred for the zeolite to be soaked in an acid solution by any suitable means known in the art for contacting the zeolite with such acid solution. The acid solution used to treat the zeolite can be a solution of any acid that provides leaching of aluminum atoms from the zeolite particles. Preferably, the acid concentration in this solution is about 1–10 equivalents per liter. Sulfuric, phosphoric, nitric and hydrochloric acids are among the acids suitable for treating the zeolite. The preferred acid solution is aqueous hydrochloric acid. The zeolite is soaked in the acid solution (preferably at a temperature within the range of about 50–100° C.) for a period of up to about 15 hours, but, preferably, in a range of about 0.1 hour to about 12 hours. The acid treated zeolite resulting from the soaking is washed free of the acid.

After the acid treated zeolite is washed free of the acid, the resulting product is exposed, by any suitable method known in the art, to a gas atmosphere under temperature and pressure conditions and for a period of time that is suitable to provide a desired heat treated product. These conditions of temperature and pressure and the period of time of treatment are the same as set out above in the discussion of the heat treatment of a zeolite that is to be used without acid treatment.

Addition of Zinc

After the heat treatment, if employed, the washed, acid treated zeolite is further treated to provide a zinc-containing catalyst composition. The zinc can be incorporated into either, in accordance with the first embodiment of this invention, a zeolite that has not been acid leached or, in accordance with the second embodiment of this invention, an acid leached zeolite. Any suitable means for incorporating metallic elements into a substrate material. A preferred method of incorporation is the use of any incipient wetness technique for impregnating the acid leached zeolite substrate with the metal. This preferred method uses a liquid impregnation solution containing the desired concentration of zinc to ultimately provide a final catalyst composition having the desired concentration of zinc.

As used herein, the term "zinc" refers to elemental zinc, inorganic zinc compounds, organic zinc compounds and mixtures of any two or more thereof. Examples of suitable zinc compounds include zinc acetate dihydrate, zinc acetylacetonate hydrate, zinc bromide, zinc carbonate hydroxide, zinc chloride, zinc borate, zinc silicate, zinc aluminate, zinc chromite, zinc cyclohexanebutyrate dihydrate, zinc 2-ethylhexanoate, zinc fluoride, zinc hexafluoroacetylacetonate dihydrate, zinc iodide, zinc molybdate, zinc naphthenate, zinc nitrate hexahydrate, zinc oxide, zinc perchlorate hexahydrate, zinc phosphate hydrate, zinc phosphide, zinc protoporphyrin, zinc sulfate monohydrate, zinc sulfide, zinc telluride, zinc tetrafluoroborate hydrate, zinc titanate and zinc trifluoromethane sulfonate. Inorganic zinc compounds are particularly preferred. The most preferred zinc compound is zinc nitrate.

Zinc is incorporated into the zeolite to form a mixture of zeolite and zinc. The zinc can be incorporated into the zeolite by any suitable means or method known in the art for incorporating metallic elements into a substrate material. One method is to mix the zeolite with at least one anhydrous zinc compound, followed by a heat treatment preferably at about 700–800° C. for about 1–10 hours in an inert gas stream. Another method, presently preferred for impregnating zeolite that has not been acid leached, uses a liquid impregnation solution containing a concentration of zinc sufficient to ultimately provide the final inventive composition with the concentration of zinc in the required range. Yet another method, presently preferred for incorporating zinc into an acid leached zeolite, uses an ion exchange technique to provide an amount of incorporated zinc in the required range.

If zinc is incorporated into the zeolite with an aqueous solution of a zinc compound, the preferred impregnation solution is an aqueous solution formed by dissolving a salt of zinc(preferably $ZnCl_2$) in water. It is acceptable, however, to use a somewhat acidic solution to aid in the dissolution of the zinc salt. The zinc-impregnated, acid treated zeolite is then heat treated, preferable at about 700–800° for about 1–10 hours in an inert gas stream.

For the incorporation of zinc into the acid treated zeolite any suitable zinc salt can be mixed with the zeolite and the zinc salt/zeolite mixture then washed with an aqueous solution of a suitable ion exchange agent, preferably 1M ammonium nitrate ($NH_4NO_3$). The washed catalyst is then filtered, washed with deionized water, dried and, preferably, calcined to obtain zinc-incorporated zeolite.

The amount of zinc incorporated or impregnated into the zeolite, whether acid leached or not, should provide a concentration effective to assure predetermined aromatics and olefin conversion yields with low coke production employing the catalyst composition in the conversion of a hydrocarbon feedstock. Generally, the weight percent of zinc present in the impregnated acid treated zeolite is in a range of up to about 10 weight percent of the impregnated acid treated zeolite. The preferred concentration of zinc in the impregnated zeolite, whether or not acid treated, is in the range of about 0.05 to about 8 weight percent and, more preferably, from about 0.1 to about 6 weight percent.

The zinc impregnated acid treated zeolite is subjected, in accordance with the first embodiment of this invention, to a steam treatment in which the zinc impregnated acid treated zeolite is contacted with a water vapor saturated stream of gas for a period of time at an elevated temperature to produce a steam treated zinc impregnated acid treated zeolite. The carrier gas for the water vapor is a gas that is inert in the presence of water to the components of the catalyst. A preferred carrier gas is helium. The period of contact can be in the range of up to about 24 hours, preferably about 1 to about 15 hours and more preferably about 2 to about 12 hours. The temperature of the steam treatment can be in the range of about 575° C. to about 675° C., more preferably about 600° C. to about 650° C.

The steam treated zinc impregnated acid treated zeolite can be subjected to heat treating by which it is exposed by any suitable method known in the art to a gas atmosphere under temperature and pressure conditions and for a period of time to provide a desired heat treated material. The gas used in the heat treatment of the acid treated zeolite can be selected from the group consisting of inert gases (nitrogen, helium, argon and the like), reducing gases (carbon monoxide, hydrogen and the like), air, oxygen and steam. The preferred gas is selected from among air, oxygen, nitrogen, steam and mixtures thereof. Most preferably, the treatment gas is selected from among air, oxygen, nitrogen and mixtures of two thereof.

Generally, this heat treatment can be conducted at a pressure in a range from below atmospheric pressure to about 1000 pounds per square inch absolute (psia). More typically, however, the pressure range is from about atmospheric to about 100 psia. The temperature of this heat treatment is generally in the range of about 500° C. to about 1000° C. Preferably, this temperature range is from about 600° C. to about 900° C. and, most preferably, the temperature of this heat treatment is in a range of about 650° C. to about 850° C.

The time period for conducting this heat treatment must be sufficient to provide a material that is substantially dry, i.e., free of water. Generally, the period of time during which the acid treated zeolite is exposed to treating gas at appropriate conditions of temperature and pressure can range from about 0.1 hour to about 30 hours. Preferably, this heat treatment is conducted for a time period in the range of about 0.25 hour to about 20 hours and, most preferably, from about 0.5 hour to about 10 hours.

Addition of Silylating Agent

The rate of coke production in the conversion of cracked hydrocarbons can be slowed when either the steam treated, zinc impregnated, acid leached zeolite or the zinc incorporated, acid treated zeolite is further treated by silylation by impregnation with a silylating agent. Silicon can be incorporated into either of these zinc-containing zeolites by any suitable means or method known in the art for incorporating metallic elements into a substrate material. A preferred method is the use of any standard incipient wetness technique for impregnating these zinc-containing zeolites with the silylating agent. The preferred method uses a liquid impregnation solution containing a concentration of silicon that will ultimately provide a final inventive composition having the required concentration of silicon.

After the silylation process is completed the inventive compositions must be subjected to a heat treatment in an oxidizing atmosphere to convert the incorporated silicon into $SiO_2$. The heat treatment is carried out at a temperature in the range of about 450° C. to about 650° C. for a period sufficient to convert the silicon into $SiO_2$, usually in a range of about 4 to about 10 hours.

As used herein, the terms "silicon" and "silylating agent" refer to elemental silicon, inorganic silicon compounds and organic silicon compounds and mixtures of any two or more thereof. Organic silicon compounds are particularly preferred and most preferred are silicon compounds selected from poly(methylphenylsiloxane), tetraethoxysilicon and mixtures thereof.

The amount of silicon incorporated or impregnated into the zinc-containing zeolite must be sufficient to give a concentration of silicon in the final inventive composition that is effective in providing the desirable properties of favorable aromatics and olefin conversion yields with low coke production when the inventive catalyst composition is used in the conversion of a hydrocarbon feed. The weight percent of silicon present in the silylated, zinc-containing, zeolite mixture is generally in the range upwardly to about 50 weight percent of either the steam treated, zinc-impregnated zeolite or the zinc-incorporated, acid leached zeolite. The preferred concentration of silicon in either the silylated, steam treated, zinc-impregnated zeolite or the silylated, zinc-incorporated, acid leached zeolite is in the range of about 0.05 to about 30 weight percent of the mixture and, most preferably, from about 0.1 to about 20 weight percent of the total mixture.

The inventive compositions described herein can also contain an inorganic binder (also called matrix material) preferably selected from among alumina, silica, alumina-silica, aluminum phosphate, clays (such as bentonite) and mixtures thereof. The content of the impregnated zeolite component of the mixture of impregnated zeolite (whether or not acid leached) and inorganic binder is about 50–99 (preferably about 50–80) weight percent. The content of the above-listed inorganic binders in the mixture of impregnated zeolite and inorganic binder is about 1–50 weight percent. Generally, the impregnated zeolite and organic binder components are compounded and subsequently shaped (such as by pelletizing, extruding or tableting). Generally the surface area of the compounded composition is about 50–700 $m^2/g$, and the particle size is about 1–10 mm.

The atomic ratio of silicon to zinc in a mixture of silylated zeolite and zinc of this invention should be such as to provide properties as described elsewhere herein. Generally, the atomic ratio of silicon to zinc in the silylated zeolite and zinc mixture is in the range of about 1:1 to about 30:1, preferably about 2:1 to about 25:1 and more preferably from about 3:1 to about 20:1.

The process of this invention applies most specifically to the conversion of cracked hydrocarbon feedstocks to aromatic hydrocarbons. The preferred feedstocks of this invention are cracked hydrocarbon feedstocks from the catalytic cracking (e, fluidized catalytic cracking and hydrocracking) of gas oils and the thermal cracking of light hydrocarbons, naphthas, gas oils, reformates and straight-run gasoline. The cracked gasoline feedstock generally comprises hydrocarbons containing 2–16 carbon atoms per molecule chosen from among paraffins (alkanes) and/or olefins (alkenes) and/or naphthenes (cycloalkanes). The most preferred feedstock for processes of this invention is a cracked gasoline derived from the fluidized catalytic cracking of gas oil, suitable for use as at least a gasoline blend stock generally having a boiling range of from about 80° F. to about 430° F. The boiling range of the cracked hydrocarbon feedstock is determined by the standard ASTM method for measuring the initial boiling point and the end-point temperatures. Generally the content of paraffins exceeds the combined content of olefins, naphthenes, and aromatics (if present). The process of this invention is principally directed to the aromatization of a cracked hydrocarbon feedstock. It is specifically noted that the alkylation of aromatic compounds is substantially absent because either the reaction does not take place or insubstantial quantities of aromatics are present in the feedstock in the process of this invention.

Cracked hydrocarbon feedstock and the catalyst composition can be contacted within a reaction zone in any suitable manner. The contacting can be operated as a batch process or, preferably, as a continuous process. In a continuous process a solid catalyst bed, a moving catalyst bed or a fluidized catalyst bed can be employed. Each of these modes of operation has known advantages and disadvantages so that one skilled in the art can select the mode most suitable for a particular feedstock and catalyst.

Contacting the hydrocarbon feedstock and the catalyst composition is preferably carried out in a conversion reaction zone which contains the catalyst composition employing reaction conditions that promote the formation of olefins, preferably light olefins, and aromatics, preferably BTX, from at least a portion of the hydrocarbons in the cracked hydrocarbon feedstock. The reaction temperature employed in the contacting is in the range of from about 400° C. to about 900° C., preferably, from about 500° C. to about 800° C. and, more preferably, from 600° C. to about 700° C. The pressure employed in the contacting can range from subatmospheric up to about 500 psia and, preferably, from about atmospheric to about 400 psia.

The flow rate at which the cracked hydrocarbon feedstock is charged to the conversion reaction zone for contact with the catalyst composition is selected to provide a weight hourly space velocity (WHSV) in a range having an upward limit of about 1000 hour$^{-1}$. The term "weight hourly space velocity", as used herein, shall mean the numerical ratio of the rate at which a cracked hydrocarbon feedstock is charged to the conversion reaction zone in pounds per hour divided by the pounds of catalyst contained in the conversion reaction zone to which the hydrocarbon is charged. The preferred WHSV of the feed to the conversion reaction zone, or contacting zone, can be in the range of from about 0.25 hour$^{-1}$ to about 250 hour$^{-1}$ and, more preferably, from about 0.5 hour$^{-1}$ to about 100 hour$^{-1}$.

The following examples are presented to further illustrate this invention and are not to be construed as unduly limiting its scope.

EXAMPLE I

This example illustrates the preparation of catalysts which were subsequently tested as catalysts in the conversion to ethylene, propylene and BTX of a gasoline sample, which had been produced in a commercial fluidized catalytic cracking unit (FCC).

Catalyst A (Control)- Zeolite

Catalyst A was a commercially available ZSM-5 catalyst provided by United Catalysts Inc. of Louisville, Ky. under their product designation "T-4480".

Catalyst B (Control)- Zeolite, Steam Treated at 500° C.

A quantity of 20 gm of commercially available ZSM-5 catalyst of Catalyst A was charged to a steam reactor. The reactor was run for 6 hours at 500° C. with a helium flow of 1000 ml/min and a water flow of 20 ml/hr to produce steam treated zeolite.

Catalyst C (Control)- ZnNO$_3$ Impregnated Zeolite, Steam Treated at 500° C.

A 20.0 gram quantity of the above-described ZSM-5 catalyst was calcined and impregnated to incipient wetness with an 11.83 gram quantity of a 15 weight percent aqueous solution of hydrated zinc nitrate (Zn(NO$_3$)$_2$·6H$_2$O) to provide an impregnated zeolite containing 1.90 weight percent Zn(NO$_3$). The Zn(NO$_3$) impregnated zeolite was dried in air for 6 hours and then contacted for 6 hours at 500° C. with a 50 ml/min stream of He saturated with H$_2$O. The steam treated, Zn(NO$_3$) impregnated zeolite was then calcined by contact with He at 538° C. for 6 hours.

Catalyst D (Control)- ZnNO$_3$ Impregnated Zeolite, Steam Treated at 625° C.

A 20 gram quantity of the above-described ZSM-5 catalyst was treated as described for Catalyst C with the exception of being contacted for 6 hours at 625° C. (instead of 500° C.) with a 50 ml/min stream of He saturated with H$_2$O to produce ZnNO$_3$ impregnated zeolite, steam treated at 625° C.

Catalyst E (Invention)- ZnNO$_3$ Impregnated Zeolite, Steam Treated at 625° C., Silylated and Calcined A quantity of 5.09 grams of the ZnNO$_3$ impregnated zeolite, steam treated at 625° C. produced for Catalyst D was impregnated to incipient wetness with 2.33 grams of a solution of 50 weight percent poly(methylphenylsiloxane) in cyclohexane. The resulting catalyst was calcined at 538° C. for 6 hours to obtain 5.63 grams of silylated, steam treated, ZnNO$_3$ impregnated zeolite.

Catalyst F (Invention)- Calcined Silylated Zn-Incorporated Acid Leached Zeolite A quantity of 50.0 grams of ZSM-5 zeolite was soaked in a 6N aqueous HCL solution for two hours at a constant temperature of about 90° C. After soaking, the catalyst was separated from the acid solution and thoroughly washed with deionized water and dried. The acid leached, washed and dried catalyst was calcined at 525° C. for 4 hours to provide 35.9 grams of acid leached zeolite.

A quantity of 5.0 grams of the acid leached zeolite was mixed with 1.33 grams of ZnCl$_2$ and the mixture washed with 60 grams of an aqueous 1M ammonium nitrate (NH$_4$NO$_3$) solution. The washed catalyst was filtered, washed with deionized water, dried for 6 hours at 90° C. and calcined in air for 4 hours at 500° C. to obtain zinc-incorporated zeolite.

The zinc-incorporated zeolite was impregnated to incipient wetness with a solution of 50 weight percent poly (methylphenylsiloxane) in cyclohexane. The resulting zinc incorporated zeolite impregnated with silicon was then calcined at 538° C. for 6 hours to obtain a silylated zinc-implanted, acid leached zeolite.

EXAMPLE II

This example illustrates the use of the Zeolite materials described in Example I as catalysts in the conversion of a gasoline feed to incremental aromatics such as benzene, toluene and xylene (BTX) and lower olefins (ethylene and propylene).

For each of the test runs, a 5.0 g sample of the catalyst materials described in Example I was placed into a stainless steel tube reactor (length: about 18 inches; inner diameter: about 0.5 inch). Gasoline boiling range feedstock from a catalytic cracking unit of a refinery was passed through the reactor at a flow rate of about 14 ml/hour, at a temperature of about 600° C. and at atmospheric pressure (about 0 psig). The formed reaction product exited the reactor tube and passed through several ice-cooled traps. The liquid portion remained in these traps and was weighed. The volume of the gaseous portion which exited the traps was measured in a "wet test meter". Liquid and gaseous product samples (collected at hourly intervals) were analyzed by means of a gas chromatograph. Results of the test runs for Catalysts A through C are summarized in Table 1. All test data were obtained after 8 hours on stream.

TABLE 1

| Catalyst | | Steam | SiO$_2$ | Ethylene[1] | Propylene[1] | BTX[1] | Coke[2] |
|---|---|---|---|---|---|---|---|
| A | Zeolite | No | No | 6.6 | 6.4 | 41.4 | 4.4 |
| B | Zeolite | 500° C. | No | 8.8 | 9.7 | 35.9 | 4.5 |
| C | Zeolite Zn(NO$_3$) | 500° C. | No | 4.3 | 3.5 | 53.5 | 3.2 |
| D | Zeolite Zn(NO$_3$) | 650° C. | No | 7.7 | 10.4 | 42.0 | 2.7 |
| E | Zeolite Zn(NO$_3$) | 650° C. | Yes | 9.0 | 12.5 | 38.1 | 1.0 |
| F | Zeolite[3] Zn[4] | No | Yes | 8.5 | 7.9 | 45.5 | 0.2 |

[1]Weight percent in Product
[2]Percent/Hour Deposited
[3]Acid Leached
[4]Zinc implanted by Ion Exchange The test data presented in Table 1 show that the invention catalysts E–F of this invention produced ethylene, propylene and BTX in a range as good or better than the control catalysts A–D with the silylated, steam treated, ZnNO$_3$ impregnated zeolite providing relatively higher rates of ethylene and propylene production and the silylated zinc-implanted, acid leached zeolite providing relatively higher rates of BTX production than all tested catalysts except Catalyst C. Each of the invention catalysts, however, attained these productions while producing coke at a much lower rate than any of the control catalysts.

A comparison of the tested catalysts shows that a steam treatment (Catalyst B) of the basic zeolite catalyst (Catalyst B) gives a higher product yield and an upgrade of the currently higher valued olefins, but maintains the high coke production. The incorporation of zinc into the catalyst generally favors BTX production (Catalysts C–F), but maintains the high coke production (Catalysts C–D) while the increase in steam treating temperature (Catalysts D–E) dramatically increases the currently more valuable olefin production. The silylated catalysts (Catalysts E–F) provide a reduced coke production which enhances the value of the process by increasing the operating time between cleanings of the equipment. The illustrated effects on the final catalyst performance show the criticality of each of the steps in the production of a catalyst.

Reasonable variations, modifications and adaptations can be made within the scope of the disclosure and the appended claims without departing from the scope of this invention.

That which is claimed is:

1. A method for converting a cracked gasoline feedstock to a product comprising incremental aromatics and lower olefins comprising contacting the cracked gasoline feedstock with a catalyst composition under conditions sufficient to convert the cracked gasoline feedstock to a product containing incremental aromatics and lower olefins wherein the catalyst is made by a method comprising:
   (A) impregnating a zinc compound into a zeolite to provide a zinc impregnated zeolite;
   (B) steam treating the zinc impregnated zeolite to provide a steam treated zinc impregnated zeolite;
   (C) treating the steam treated, zinc impregnated zeolite with a silylating agent to provide a silylated steam treated zinc impregnated zeolite and
   (D) calcining the silylated steam treated zinc impregnated zeolite to provide a calcined silylated steam treated zinc impregnated zeolite.

2. A method for converting a cracked gasoline feedstock to a product comprising incremental aromatics and lower olefins according to the method of claim 1 wherein the zeolite is impregnated to incipient wetness with the zinc compound thereby providing a zinc impregnated zeolite.

3. A method for converting a cracked gasoline feedstock to a product comprising incremental aromatics and lower olefins according to the method of claim 2 wherein the zinc compound is zinc nitrate.

4. A method for converting a cracked gasoline feedstock to a product comprising incremental aromatics and lower olefins according to the method of claim 2 wherein the steam treating of the zinc impregnated zeolite comprises treating the zinc impregnated zeolite at 575° C.–675° C. in the presence of water vapor and a carrier gas inert to the catalyst components thereby providing a steam treated zinc impregnated zeolite.

5. A method for converting a cracked gasoline feedstock to a product comprising incremental aromatics and lower olefins according to the method of claim 3 wherein the steam treating of the zinc impregnated zeolite comprises treating the zinc impregnated zeolite at 575° C.–675° C. in the presence of water vapor and a carrier gas inert to the catalyst components thereby providing a steam treated zinc impregnated zeolite.

6. A method for converting a cracked gasoline feedstock to a product comprising incremental aromatics and lower olefins according to the method of claim 4 wherein the steam treated zinc impregnated zeolite is impregnated to incipient wetness with the silylating agent thereby providing a silylated steam treated zinc impregnated zeolite.

7. A method for converting a cracked gasoline feedstock to a product comprising incremental aromatics and lower olefins according to the method of claim 5 wherein the steam treated zinc impregnated zeolite is impregnated to incipient wetness with the silylating agent thereby providing a silylated steam treated zinc impregnated zeolite.

8. A method for converting a cracked gasoline feedstock to a product comprising incremental aromatics and lower olefins according to the method of claim 6 wherein the silylating agent is poly(methylphenylsiloxane).

9. A method for converting a cracked gasoline feedstock to a product comprising incremental aromatics and lower olefins according to the method of claim 7 wherein the silylating agent is poly(methylphenylsiloxane).

10. A method for converting a cracked gasoline feedstock to a product comprising incremental aromatics and lower olefins according to the method of claim 6 wherein the silylated steam treated zinc impregnated zeolite is calcined in the presence of an oxidizing atmosphere at a temperature in the range of about 450° C. to about 650° C. for a period of time in a range of about 4 to about 10 hours thereby providing a calcined silylated steam treated zinc impregnated zeolite.

11. A method for converting a cracked gasoline feedstock to a product comprising incremental aromatics and lower olefins according to the method of claim 7 wherein the silylated steam treated zinc impregnated zeolite is calcined in the presence of an oxidizing atmosphere at a temperature in the range of about 450° C. to about 650° C. for a period of time in a range of about 4 to about 10 hours thereby providing a calcined silylated steam treated zinc impregnated zeolite.

12. A method for converting a cracked gasoline feedstock to a product comprising incremental aromatics and lower olefins comprising contacting the cracked gasoline feedstock with a catalyst composition under conditions sufficient to convert the cracked gasoline feedstock to a product comprising incremental aromatics and lower olefins wherein the catalyst is made by a method comprising:

(A) acid leaching a zeolite;

(B) impregnating a zinc compound into a zeolite to provide a zinc impregnated zeolite;

(C) steam treating the zinc impregnated zeolite to provide a steam treated zinc impregnated zeolite;

(D)) impregnating the steam treated, zinc impregnated zeolite with a silylating agent to provide a silylated steam treated zinc impregnated zeolite and (E) calcining the silylated steam treated zinc impregnated zeolite to provide a calcined silylated steam treated zinc impregnated zeolite.

13. A method for converting a cracked gasoline feedstock to a product comprising incremental aromatics and lower olefins according to method of claim 12 wherein acid leaching the zeolite comprises treating the zeolite with an acid, washing the acid treated zeolite to substantially remove the acid and subsequently calcining the washed, acid treated zeolite thereby providing a calcined acid leached zeolite.

14. A method for converting a cracked gasoline feedstock to a product comprising incremental aromatics and lower olefins according to the method of claim 13 wherein the acid leached zeolite is impregnated to incipient wetness with the zinc compound thereby providing a zinc impregnated acid leached zeolite.

15. A method for converting a cracked gasoline feedstock to a product comprising incremental aromatics and lower olefins according to the method of claim 14 wherein the zinc compound is zinc nitrate.

16. A method for converting a cracked gasoline feedstock to a product comprising incremental aromatics and lower olefins according to the method claim 14 wherein the steam treating of the zinc impregnated acid leached zeolite comprises treating the zinc impregnated acid leached zeolite at 575° C.–675° C. in the presence of water vapor and a carrier gas inert to the catalyst components thereby providing a steam treated zinc impregnated acid leached zeolite.

17. A method for converting a cracked gasoline feedstock to a product comprising incremental aromatics and lower olefins according to the method of claim 15 wherein the steam treating of the zinc impregnated acid leached zeolite comprises treating the zinc impregnated acid leached zeolite at 575° C.–675° C. in the presence of water vapor and a carrier gas inert to the catalyst components thereby providing a steam treated zinc impregnated acid leached zeolite.

18. A method for converting a cracked gasoline feedstock to a product comprising incremental aromatics and lower olefins according to the method of claim 16 wherein the steam treated zinc impregnated acid leached zeolite is impregnated to incipient wetness with the silylating agent thereby providing a silylated steam treated zinc impregnated acid leached zeolite.

19. A method for converting a cracked gasoline feedstock to a product comprising incremental aromatics and lower olefins according to the method of claim 17 wherein the steam treated zinc impregnated acid leached zeolite is impregnated to incipient wetness with the silylating agent thereby providing a silylated steam treated zinc impregnated acid leached zeolite.

20. A method for converting a cracked gasoline feedstock to a product comprising incremental aromatics and lower olefins according to the method of claim 18 wherein the silylating agent is poly (methylphenylsiloxane).

21. A method for converting a cracked gasoline feedstock to a product comprising incremental aromatics and lower olefins according to the method of claim 19 wherein the silylating agent is poly (methylphenylsiloxane).

22. A method for converting a cracked gasoline feedstock to a product comprising incremental aromatics and lower olefins according to the method of claim 18 wherein the silylated steam treated zinc impregnated acid leached zeolite is calcined in the presence of an oxidizing atmosphere at a temperature in the range of about 450° C. to about 650° C. for a period of time in the range of about 4 to about 10 hours thereby providing a calcined silylated steam treated zinc impregnated acid leached zeolite.

23. A method for converting a cracked gasoline feedstock to a product comprising incremental aromatics and lower olefins according to the method of claim 19 wherein the silylated steam treated zinc impregnated acid leached zeolite is calcined in the presence of an oxidizing atmosphere at a temperature in the range of about 450° C. to about 650° C. for a period of time in the range of about 4 to about 10 hours thereby providing a calcined silylated steam treated zinc impregnated acid leached zeolite.

\* \* \* \* \*